United States Patent
Kim et al.

(10) Patent No.: US 10,731,734 B2
(45) Date of Patent: Aug. 4, 2020

(54) PLANETARY GEAR TRAIN OF AN AUTOMATIC TRANSMISSION FOR A VEHICLE

(71) Applicants: HYUNDAI MOTOR COMPANY, Seoul (KR); KIA MOTORS CORPORATION, Seoul (KR)

(72) Inventors: Jin Ho Kim, Suwon-si (KR); Jae Joon Lee, Anyang-si (KR); Jong Sool Park, Hwaseong-si (KR); Kyeong Hun Lee, Seoul (KR); Jong Soo Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 203 days.

(21) Appl. No.: 15/962,717

(22) Filed: Apr. 25, 2018

(65) Prior Publication Data

US 2019/0128386 A1    May 2, 2019

(30) Foreign Application Priority Data

Oct. 31, 2017  (KR) .................. 10-2017-0143292

(51) Int. Cl.
| | |
|---|---|
| *F16H 3/62* | (2006.01) |
| *F16H 3/44* | (2006.01) |
| *F16H 37/06* | (2006.01) |
| *F16H 3/66* | (2006.01) |

(52) U.S. Cl.
CPC ....... *F16H 3/66* (2013.01); *F16H 2200/0069* (2013.01); *F16H 2200/2015* (2013.01); *F16H 2200/2046* (2013.01)

(58) Field of Classification Search
CPC ................ F16H 2200/2015; F16H 2200/2046
See application file for complete search history.

(56) References Cited

U.S. PATENT DOCUMENTS

| | | | | |
|---|---|---|---|---|
| 3,433,094 | A * | 3/1969 | Phillips | F16H 3/66 475/59 |
| 3,815,445 | A * | 6/1974 | Gorrell | F16H 3/66 475/286 |
| 7,297,085 | B2 * | 11/2007 | Klemen | F16H 3/66 475/280 |
| 2014/0038766 | A1 * | 2/2014 | Koch | F16H 3/66 475/276 |
| 2018/0328464 | A1 * | 11/2018 | Kim | F16H 3/66 |
| 2018/0328469 | A1 * | 11/2018 | Kim | F16H 3/66 |
| 2019/0120337 | A1 * | 4/2019 | Lee | F16H 3/666 |

FOREIGN PATENT DOCUMENTS

| | | | | |
|---|---|---|---|---|
| DE | 2757799 A1 * | 6/1978 | ............. | F16H 3/666 |
| GB | 796666 A * | 6/1958 | ............. | F16H 3/66 |
| SU | 1597477 A1 * | 10/1990 | ............. | F16H 3/66 |

* cited by examiner

*Primary Examiner* — Tisha D Lewis
(74) *Attorney, Agent, or Firm* — Lempia Summerfield Katz LLC (57) ABSTRACT

A planetary gear train of an automatic transmission for a vehicle includes input and output shafts, and first, second, third, fourth, and fifth planetary gear sets, each including three rotation elements. The planetary gear train also includes nine shafts for selectively connecting the planetary gear sets, the input and output shafts, and a transmission housing in various configurations to achieve at least ten forward speeds and at least one reverse speed.

15 Claims, 4 Drawing Sheets

| Shift-stage | Engagement element | | | | | | Gear ratio | Step ratio | Remark |
|---|---|---|---|---|---|---|---|---|---|
| | C1 | C2 | C3 | B1 | B2 | B3 | | | |
| D1 | | | ● | | ● | ● | 4.882 | | |
| D2 | | ● | | | ● | ● | 3.287 | 1.485 | |
| D3 | | ● | | ● | | ● | 2.275 | 1.445 | |
| D4 | | ● | ● | | | ● | 1.610 | 1.413 | |
| D5 | ● | ● | | | | ● | 1.377 | 1.169 | Gear ratio span : 8.9 |
| D6 | ● | | ● | | | ● | 1.156 | 1.191 | |
| D7 | ● | | ● | | | | 1.000 | 1.156 | |
| D8 | ● | | | | ● | | 0.813 | 1.230 | Gear ratio of R/D1 : 0.86 |
| D9 | ● | | | ● | ● | | 0.678 | 1.199 | |
| D10 | ● | ● | | | ● | | 0.547 | 1.239 | |
| REV | | | ● | ● | | ● | -4.209 | | |

FIG. 3

FIG. 4 ary gear train of an automatic transmission for a vehicle.

CROSS-REFERENCE TO RELATED APPLICATION

This application claims priority to and the benefit of Korean Patent Application No. 10-2017-0143292 filed in the Korean Intellectual Property Office on Oct. 31, 2017, the entire contents of which are incorporated herein by reference.

BACKGROUND

(a) Field of the Disclosure

The present disclosure relates to automatic transmissions for vehicles. More particularly, the present disclosure relates to a planetary gear train of an automatic transmission of a vehicle.

(b) Description of the Related Art

Research into realizing more shift-stages of automatic transmissions has been conducted to enhance vehicle fuel consumption and drivability. Increasing oil prices have triggered fierce competition to enhance vehicle fuel consumption.

Research into weight reduction and enhanced fuel consumption through downsizing of an engine has been conducted. Research has also been conducted on automatic transmissions to simultaneously provide better drivability and fuel consumption by achieving more shift stages.

In order to achieve more shift stages for an automatic transmission, the number of parts is typically increased. As a result, this may deteriorate the installability, production cost, weight and/or power flow efficiency.

Eight-speed automatic transmissions have been recently introduced, and a planetary gear train for an automatic transmission enabling more shift stages is under investigation.

Conventional automatic transmissions of eight or more shift-stages typically include three to four planetary gear sets and five to seven engagement elements (frictional elements). As a result, the automatic transmission may easily become lengthy, thereby deteriorating installability.

Disposing planetary gear sets in parallel or employing dog clutches instead of wet-type control elements have been attempted. However, such arrangements may not be widely applicable, and using dog clutches may easily deteriorate shift-feel.

The above information disclosed in this Background section is only to enhance understanding of the background of the disclosure. Therefore, the background may contain information that is not prior art that is already known in this country to a person of ordinary skill in the art.

SUMMARY

The present disclosure relates to a planetary gear train of an automatic transmission for a vehicle. The disclosed planetary gear train enables at least ten forward speeds, thereby improving vehicle performance and fuel efficiency.

A planetary gear train of an automatic transmission for a vehicle may include an input shaft for receiving an input torque, an output shaft for outputting a shifted torque, a first planetary gear set having first, second, and third rotation elements, a second planetary gear set having fourth, fifth, and sixth rotation elements, a third planetary gear set having seventh, eighth, and ninth rotation elements, a fourth planetary gear set having tenth, eleventh, and twelfth rotation elements, and a fifth planetary gear set having thirteenth, fourteenth, and fifteenth rotation elements. A planetary gear train may further include: a first shaft fixedly connected with the first rotation element and the fifth rotation element, and fixedly connected with the input shaft: a second shaft fixedly connected with the fourteenth rotation element and fixedly connected with the output shaft: a third shaft fixedly connected with the second rotation element: a fourth shaft fixedly connected with the third rotation element and the ninth rotation element: a fifth shaft fixedly connected with the sixth rotation element and the tenth rotation element: a sixth shaft fixedly connected with the eighth rotation element, the eleventh rotation element, and the fifteenth rotation element: and a plurality of additional shafts, each of which is selectively connected to a transmission housing and fixedly connected to a rotation element of the second, third, fourth, and fifth planetary gear sets that is not fixedly connected with any of the first to sixth shafts.

The plurality of additional shafts may include: a seventh shaft fixedly connected with the fourth rotation element and the seventh rotation element, and selectively connected with the transmission housing: an eighth shaft fixedly connected with the twelfth rotation element and selectively connected with the transmission housing: and a ninth shaft fixedly connected with the thirteenth rotation element and selectively connected with the transmission housing. The second shaft and the fifth shaft, the third shaft and the fourth shaft, and the third shaft and the seventh shaft may be selectively connected with each other, respectively.

The planetary gear train may further include three clutches each selectively connecting a corresponding pair of shafts selected among the input shaft, the output shaft, and the first to ninth shafts. The planetary gear train may also include three brakes selectively connecting the seventh shaft, the eighth shaft, and the ninth shaft to the transmission housing, respectively.

The three clutches may include a first clutch arranged between the second shaft and the fifth shaft, a second clutch arranged between the third shaft and the fourth shaft, and a third clutch arranged between the third shaft and the seventh shaft. The three brakes may include a first brake arranged between the seventh shaft and the transmission housing, a second brake arranged between the eighth shaft and the transmission housing, and a third brake arranged between the ninth shaft and the transmission housing.

The plurality of additional shafts may include: a seventh shaft fixedly connected with the fourth rotation element and the seventh rotation element, and selectively connected with the transmission housing: an eighth shaft fixedly connected with the twelfth rotation element and selectively connected with the transmission housing: and a ninth shaft fixedly connected with the thirteenth rotation element and selectively connected with the transmission housing. The second shaft and the fifth shaft, the first shaft and the third shaft, and the third shaft and the seventh shaft may be selectively connected with each other, respectively.

The planetary gear train may further include three clutches each selectively connecting a corresponding pair of shafts selected among the input shaft, the output shaft, and the first to ninth shafts. The planetary gear train may also include three brakes selectively connecting the seventh shaft, the eighth shaft, and the ninth shaft to the transmission housing, respectively.

The three clutches may include a first clutch arranged between the second shaft and the fifth shaft, a second clutch arranged between the first shaft and the third shaft, and a third clutch arranged between the third shaft and the seventh shaft. The three brakes may include a first brake arranged between the seventh shaft and the transmission housing, a second brake arranged between the eighth shaft and the transmission housing, and a third brake arranged between the ninth shaft and the transmission housing.

The plurality of additional shafts may include: a seventh shaft fixedly connected with the fourth rotation element and the seventh rotation element, and selectively connected with the transmission housing: an eighth shaft fixedly connected with the twelfth rotation element and selectively connected with the transmission housing: and a ninth shaft fixedly connected with the thirteenth rotation element and selectively connected with the transmission housing. The second shaft and the fifth shaft, the first shaft and the fourth shaft, and the third shaft and the seventh shaft may be selectively connected with each other, respectively.

The planetary gear train may further include three clutches each selectively connecting a corresponding pair of shafts selected among the input shaft, the output shaft, and the first to ninth shafts. The planetary gear train may also include three brakes selectively connecting the seventh shaft, the eighth shaft, and the ninth shaft to the transmission housing, respectively.

The three clutches may include a first clutch arranged between the second shaft and the fifth shaft, a second clutch arranged between the first shaft and the fourth shaft, and a third clutch arranged between the third shaft and the seventh shaft. The three brakes may include a first brake arranged between the seventh shaft and the transmission housing, a second brake arranged between the eighth shaft and the transmission housing, and a third brake arranged between the ninth shaft and the transmission housing.

The first planetary gear set may be a single pinion planetary gear set having a first sun gear, a first planet carrier, and a first ring gear as the first, second, and third rotation elements, respectively. The second planetary gear set may be a single pinion planetary gear set having a second sun gear, a second planet carrier, and a second ring gear as the fourth, fifth, and sixth rotation elements, respectively. The third planetary gear set may be a single pinion planetary gear set having a third sun gear, a third planet carrier, and a third ring gear as the seventh, eighth, and ninth rotation elements, respectively. The fourth planetary gear set may be a single pinion planetary gear set having a fourth sun gear, a fourth planet carrier, and a fourth ring gear as the tenth, eleventh, and twelfth rotation elements, respectively. The fifth planetary gear set may be a single pinion planetary gear set having a fifth sun gear, a fifth planet carrier, and a fifth ring gear as the thirteenth, fourteenth, and fifteenth rotation elements, respectively.

A planetary gear train according to an embodiment of the present disclosure may realize ten forward speeds and one reverse speed by operating five planetary gear sets by controlling six engagement elements.

A planetary gear train according to an embodiment of the present disclosure realizes shifting by controlling five planetary gear sets by six engagement elements, achieves uniform torque load over clutches and brakes, and minimizes torque load applied to the respective shaft's connection with the rotation elements, thereby enhancing durability and efficiency.

In addition, a minimal number of engagement elements are controlled to realize shifting between shift-stages of ten forward speeds and one reverse speed. Accordingly, reduction of clutch drag, enhancement of torque transmission efficiency, and enhancement of flexibility of output gear ratios are achieved, thereby enhancing linearity of step ratios.

In addition, a gear ratio span may be increased to above 8.5 while realizing ten forward speeds and one reverse speed, thereby maximizing engine power performance and fuel economy.

In addition, a planetary gear train according to an embodiment of the present disclosure may substantially improve driving stability by realizing shift-stages appropriate for rotation speed of an engine due to the multi-stages of an automatic transmission.

Further, effects that can be obtained or expected from embodiments of the present disclosure are directly or suggestively described in the following detailed description. In other words, various effects expected from embodiments of the present disclosure are described in the following detailed description.

DETAILED DESCRIPTION OF THE EMBODIMENTS

It is desired to develop a planetary gear train having advantages of realizing, by minimal complexity, at least ten forward speeds and at least one reverse speed. In this aspect, the present disclosure relates to a planetary gear train of an automatic transmission for a vehicle. The disclosed planetary gear train may improve power delivery performance and fuel consumption of an engine by using a smaller number of parts and by increasing a gear ratio span. The disclosed planetary gear train may also achieve linearity of shift stage step ratios.

Hereinafter, an embodiment of the present disclosure is described in detail with reference to the drawings. In the drawings, the following symbols are used to identify various elements of the disclosed embodiments, wherein:
  i. B1, B2, and B3 represent first, second, and third brakes;
  ii. C1, C2, and C3 represent first, second, and third clutches;
  iii. N1, N2, N3, N4, N5, N6, N7, N8, N9, N10, N11, N12, N13, N14, and N15 represent first, second, third, fourth, fifth, sixth, seventh, eighth, ninth, tenth, eleventh, twelfth, thirteenth, fourteenth, and fifteenth rotation elements;
  iv. PG1, PG2, PG3, PG4, and PG5 represent first, second, third, fourth, and fifth planetary gear sets;

v. S1, S2, S3, S4, and S5 represent first, second, third, fourth, and fifth sun gears;
vi. PC1, PC2, PC3, PC4, and PC5 represent first, second, third, fourth, and fifth planet carriers;
vii. R1, R2, R3, R4, and R5 represent first, second, third, fourth, and fifth ring gears;
viii. P1, P2, P3, P4, and P5 represent first, second, third, fourth, and fifth pinion gears;
ix. IS represents an input shaft;
x. OS represents an output shaft; and
xi. TM1, TM2, TM3, TM4, TM5, TM6, TM7, TM8, and TM9 represent first, second, third, fourth, fifth, sixth, seventh, eighth, and ninth shafts.

The drawings and description are to be regarded as illustrative in nature and not restrictive. Like reference numerals designate like elements throughout the specification.

In the following description, using names or terms to identify components such as first, second, third and the like is to differentiate the names because the names of the components are otherwise the same as each other. Such a naming convention is not intended to denote or set an order thereof, and the disclosure is not intended to be so limited.

Figure 1:
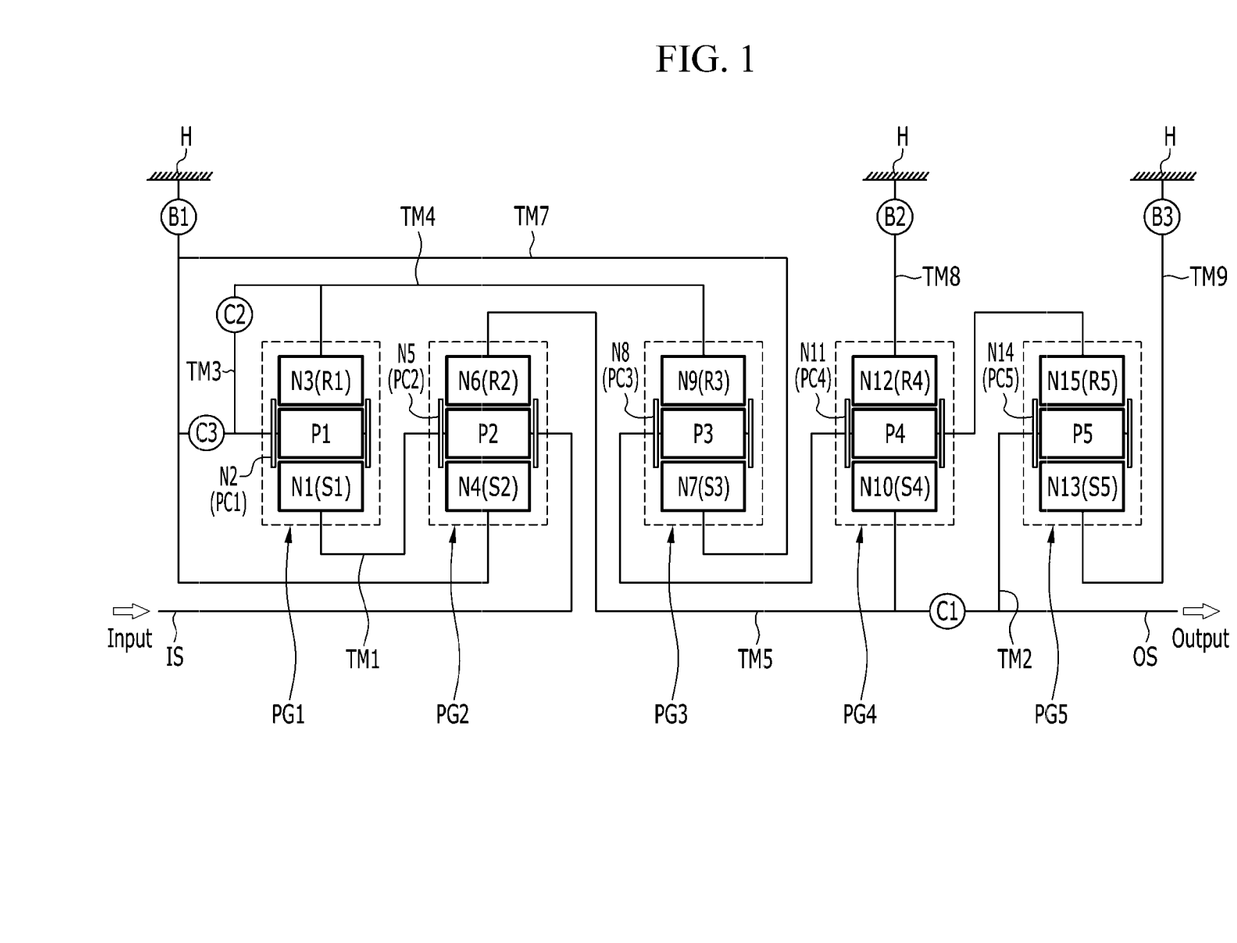
FIG. 1 is a schematic diagram of a planetary gear train according to a first embodiment of the present disclosure.

FIG. 1 is a schematic diagram of a planetary gear train according to a first embodiment of the present disclosure.

Referring to FIG. 1, a planetary gear train according to a first embodiment of the present disclosure includes first, second, third, fourth, and fifth planetary gear sets PG1, PG2, PG3, PG4, and PG5 arranged on a same axis. The planetary gear train also includes an input shaft IS, an output shaft OS, nine shafts TM1-TM9 interconnecting rotation elements of the first, second, third, fourth, and fifth planetary gear sets PG1, PG2, PG3, PG4, and PG5, engagement elements of three clutches C1-C3 and three brakes B1-B3, and a transmission housing H.

Torque input from the input shaft IS is shifted by cooperative operation of the first, second, third, fourth, and fifth planetary gear sets PG1, PG2, PG3, PG4, and PG5 and output through the output shaft OS.

In this embodiment of the present disclosure, the planetary gear sets are arranged in the order of the first, second, third, fourth, and fifth planetary gear sets PG1, PG2, PG3, PG4, and PG5, from an engine side.

The input shaft IS is an input member. The input shaft IS may receive a torque from a crankshaft of an engine through a torque converter.

The output shaft OS is an output member. The output shaft OS is arranged on the same axis as the input shaft IS and outputs a shifted driving torque to a driveshaft through a differential apparatus.

In this embodiment, the first planetary gear set PG1 is a single pinion planetary gear set. The first planetary gear set PG1 includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotation element N1, the first planet carrier PC1 acts as a second rotation element N2, and the first ring gear R1 acts as a third rotation element N3.

In this embodiment, the second planetary gear set PG2 is a single pinion planetary gear set. The second planetary gear set PG2 includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotation element N4, the second planet carrier PC2 acts as a fifth rotation element N5, and the second ring gear R2 acts as a sixth rotation element N6.

In this embodiment, the third planetary gear set PG3 is a single pinion planetary gear set. The third planetary gear set PG3 includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotation element N7, the third planet carrier PC3 acts as an eighth rotation element N8, and the third ring gear R3 acts as a ninth rotation element N9.

In this embodiment, the fourth planetary gear set PG4 is a single pinion planetary gear set. The fourth planetary gear set PG4 includes a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4. The fourth sun gear S4 acts as a tenth rotation element N10, the fourth planet carrier PC4 acts as an eleventh rotation element N11, and the fourth ring gear R4 acts as a twelfth rotation element N12.

In this embodiment, the fifth planetary gear set PG5 is a single pinion planetary gear set. The fifth planetary gear set PG5 includes a fifth sun gear S5, a fifth planet carrier PC5 rotatably supporting a plurality of fifth pinion gears P5 externally gear-meshed with the fifth sun gear S5, and a fifth ring gear R5 internally gear-meshed with the plurality of fifth pinion gears P5. The fifth sun gear S5 acts as a thirteenth rotation element N13, the fifth planet carrier PC5 acts as a fourteenth rotation element N14, and the fifth ring gear R5 acts as a fifteenth rotation element N15.

In the arrangement of the first, second, third, fourth, and fifth planetary gear sets PG1, PG2, PG3, PG4, and PG5, the first rotation element N1 is fixedly connected with the fifth rotation element N5, the third rotation element N3 is fixedly connected with the ninth rotation element N9, the fourth rotation element N4 is fixedly connected with the seventh rotation element N7, the sixth rotation element N6 is fixedly connected with the tenth rotation element N10, and the eighth rotation element N8 is fixedly connected with the eleventh rotation element N11 and the fifteenth rotation element N15, thereby forming nine shafts TM1-TM9.

The nine shafts TM1-TM9 are described in further detail below.

In this embodiment, the first shaft TM1 is fixedly connected with second rotation element N2 (first planet carrier PC1) and fifth rotation element N5 (second planet carrier PC2). The first shaft TM1 is also fixedly connected with the input shaft IS, thereby always acting as an input element.

The second shaft TM2 is fixedly connected with the fourteenth rotation element N14 (fifth planet carrier PC5). The second shaft TM2 is also fixedly connected with the output shaft OS, thereby always acting as an output element.

The third shaft TM3 is fixedly connected with the second rotation element N2 (first planet carrier PC1).

The fourth shaft TM4 is fixedly connected with the third rotation element N3 (first ring gear R1) and ninth rotation element N9 (third ring gear R3).

The fifth shaft TM5 is fixedly connected with the sixth rotation element N6 (second ring gear R2) and tenth rotation element N10 (fourth sun gear S4).

The sixth shaft TM6 is fixedly connected with the eighth rotation element N8 (third planet carrier PC3), the eleventh rotation element N11 (fourth planet carrier PC4), and the fifteenth rotation element N15 (fifth ring gear R5).

The seventh shaft TM7 is fixedly connected with the fourth rotation element N4 (second sun gear S2) and seventh rotation element N7 (third sun gear S3).

The eighth shaft TM8 is fixedly connected with the twelfth rotation element N12 (fourth ring gear R4).

The ninth shaft TM9 is fixedly connected with the thirteenth rotation element N13 (fifth sun gear S5).

In this embodiment, each of the nine shafts TM1-TM9 may be a rotational member that fixedly interconnects the input and output shafts and rotation elements of the planetary gear sets PG1, PG2, PG3, and PG4. Each of the nine shafts TM1-TM9 may also be a rotational member that selectively interconnects a rotation element to the transmission housing H, or may be a fixed member fixed to the transmission housing H.

In the disclosure, when two or more members are described as being "fixedly connected," where each of the two or more members may be any of a shaft, an input shaft, an output shaft, a rotational member, or a transmission housing, it is meant that the fixedly connected members always rotate at a same speed.

When two or more members are described as being "selectively connected" by an engagement element, it is meant that the selectively connected members rotate separately when the engagement element is not engaged and rotate at a same speed when the engagement element is engaged. It may be understood that in the case that a member is "selectively connected" with a transmission housing by an engagement element, the member may be stationary when the engagement element is engaged.

In this embodiment, the first shaft TM1 is fixedly connected with the input shaft IS, the second shaft TM2 is selectively connected with the fifth shaft TM5, the third shaft TM3 is selectively connected with the fourth shaft TM4, and the third shaft TM3 is selectively connected with the seventh shaft TM7.

The seventh shaft TM7, the eighth shaft TM8, and the ninth shaft TM9 are selectively connected with the transmission housing H, thereby selectively acting as a fixed element, respectively.

The engagement elements of the three clutches C1, C2, and C3 are arranged between the nine shafts TM1-TM9, the input shaft IS, and the output shaft OS, so as to form selective connections.

The nine shafts TM1-TM9 may be selectively connected with the transmission housing H by control elements of three brakes B1, B2, and B3.

In this embodiment, the six engagement elements of the three clutches C1-C3 and the three brakes B1-B3 are arranged as follows.

The first clutch C1 is arranged between the second shaft TM2 and the fifth shaft TM5. The first clutch C1 selectively connects the second shaft TM2 and the fifth shaft TM5, thereby controlling power delivery therebetween.

The second clutch C2 is arranged between the third shaft TM3 and the fourth shaft TM4. The second clutch C2 selectively connects the third shaft TM3 and the fourth shaft TM4, thereby controlling power delivery therebetween.

The third clutch C3 is arranged between the third shaft TM3 and the seventh shaft TM7. The third clutch C3 selectively connects the third shaft TM3 and the seventh shaft TM7, thereby controlling power delivery therebetween.

The first brake B1 is arranged between the seventh shaft TM7 and the transmission housing H. The first brake B1 selectively connects the seventh shaft TM7 to the transmission housing H.

The second brake B2 is arranged between the eighth shaft TM8 and the transmission housing H. The second brake B2 selectively connects the eighth shaft TM8 to the transmission housing H.

The third brake B3 is arranged between the ninth shaft TM9 and the transmission housing H. The third brake B3 selectively connects the ninth shaft TM9 to the transmission housing H.

The engagement elements of the first, second, and third clutches C1, C2, and C3 and the first, second, and third brakes B1, B2, and B3 may be multi-plate hydraulic pressure friction devices that are frictionally engaged by hydraulic pressure. However, it should be understood that the engagement elements are not to be limited thereto, since various other configurations that are electrically controllable may be available.

Figure 2:
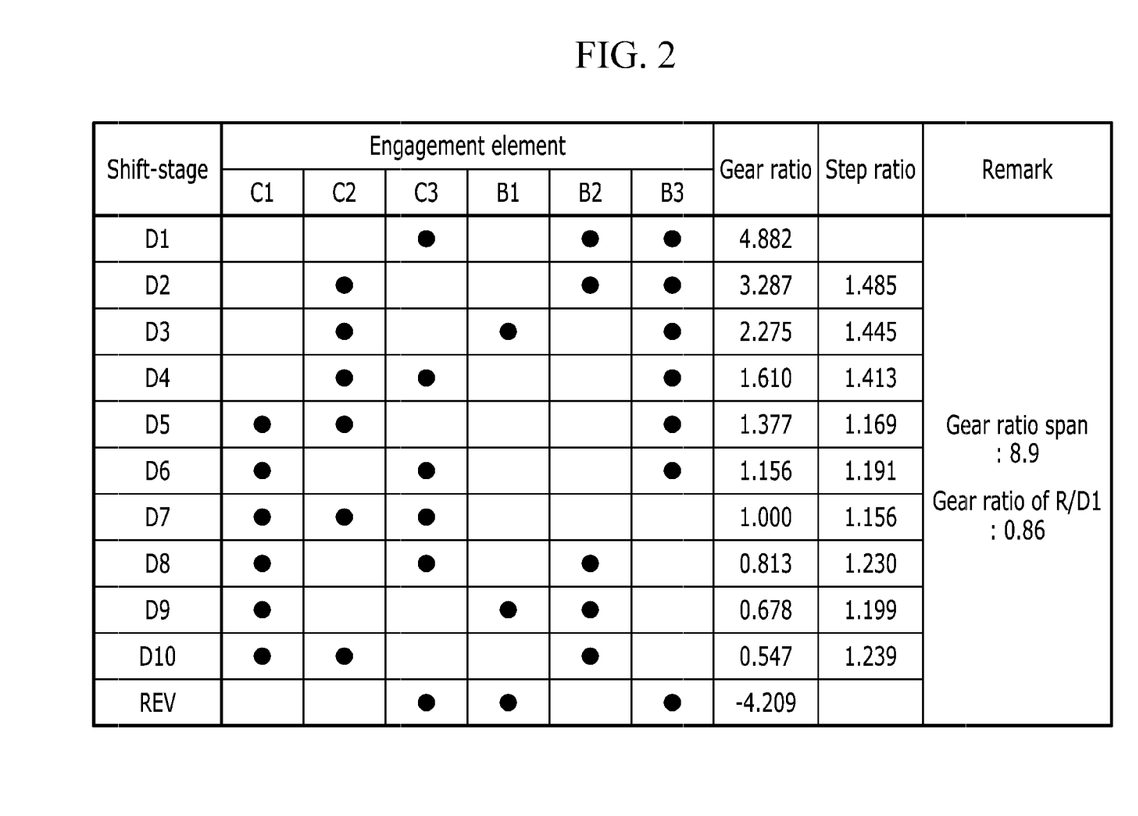
FIG. 2 is an operational chart for respective control elements at respective shift-stages applicable to a planetary gear train according to a first embodiment of the present disclosure.

FIG. 2 is an operational chart for respective control elements at respective shift-stages applicable to a planetary gear train according to a first embodiment of the present disclosure.

Referring to FIG. 2, a planetary gear train according to a first embodiment of the present disclosure realizes shifting between ten forward speeds and one reverse speed by operating three elements among the engagement elements of the first, second, and third clutches C1, C2, and C3 and the first, second, and third brakes B1, B2, and B3.

In this embodiment, in the forward first speed D1, the third clutch C3 and the second and third brakes B2 and B3 are simultaneously operated.

As a result, the first shaft TM1 always receives an input torque by being fixedly connected with the input shaft IS, and the third shaft TM3 is connected with the seventh shaft TM7 by the operation of the third clutch C3.

In addition, the eighth and ninth shafts TM8 and TM9 respectively act as fixed elements by the operation of the second and third brakes B2 and B3, thereby realizing the forward first speed D1 and outputting a shifted torque to the output shaft OS connected with the second shaft TM2.

In this embodiment, in the forward second speed D2, the second clutch C2 and the second and third brakes B2 and B3 are simultaneously operated.

As a result, the first shaft TM1 always receives an input torque by being fixedly connected with the input shaft IS, and the third shaft TM3 is connected with the fourth shaft TM4 by the operation of the second clutch C2.

In addition, the eighth and ninth shafts TM8 and TM9 respectively act as fixed elements by the operation of the second and third brakes B2 and B3, thereby realizing the forward second speed D2 and outputting a shifted torque to the output shaft OS connected with the second shaft TM2.

In this embodiment, in the forward third speed D3, the second clutch C1 and the first and third brakes B1 and B3 are simultaneously operated.

As a result, the first shaft TM1 always receives an input torque by being fixedly connected with the input shaft IS, and the third shaft TM3 is connected with the fourth shaft TM4 by the operation of the second clutch C2.

In addition, the seventh and ninth shafts TM7 and TM9 act as fixed elements by the operation of the first and third brakes B1 and B3, thereby realizing the forward third speed D3 and outputting a shifted torque to the output shaft OS connected with the second shaft TM2.

In this embodiment, in the forward fourth speed D4, the second and third clutches C2 and C3 and the third brake B3 are simultaneously operated.

As a result, the first shaft TM1 always receives an input torque by being fixedly connected with the input shaft IS, the third shaft TM3 is connected with the fourth shaft TM4 by the operation of the second clutch C2, and the third shaft TM3 is connected with the seventh shaft TM7 by the operation of the third clutch C3.

In addition, the ninth shaft TM9 acts as a fixed element by the operation of the third brake B3, thereby realizing the forward fourth speed D4 and outputting a shifted torque to the output shaft OS connected with the second shaft TM2.

In this embodiment, in the forward fifth speed D5, the first and second clutch C1 and C2 and the third brake B3 are simultaneously operated.

As a result, the first shaft TM1 always receives an input torque by being fixedly connected with the input shaft IS, the second shaft TM2 is connected with the fifth shaft TM5 by the operation of the first clutch C1, and the third shaft TM3 is connected with the fourth shaft TM4 by the operation of the second clutch C2.

In addition, the ninth shaft TM9 acts as a fixed element by the operation of the third brake B3, thereby realizing the forward fifth speed D5 and outputting a shifted torque to the output shaft OS connected with the second shaft TM2.

In this embodiment, in the forward sixth speed D6, the first and third clutches C1 and C3 and the third brake B3 are simultaneously operated.

As a result, the first shaft TM1 always receives an input torque by being fixedly connected with the input shaft IS, the second shaft TM2 is connected with the fifth shaft TM5 by the operation of the first clutch C1, and the third shaft TM3 is connected with the seventh shaft TM7 by the operation of the third clutch C3.

In addition, the ninth shaft TM9 acts as a fixed element by the operation of the third brake B3, thereby realizing the forward sixth speed D6 and outputting a shifted torque to the output shaft OS connected with the second shaft TM2.

In this embodiment, in the forward seventh speed D7, the first, second, and third clutches C1, C2, and C3 are simultaneously operated.

As a result, the first shaft TM1 always receives an input torque by being fixedly connected with the input shaft IS, the second shaft TM2 is connected with the fifth shaft TM5 by the operation of the first clutch C1, the third shaft TM3 is connected with the fourth shaft TM4 by the operation of the second clutch C2, and the third shaft TM3 is connected with the seventh shaft TM7 by the operation of the third clutch C3.

In this arrangement, the first, second, third, fourth, and fifth planetary gear sets PG1, PG2, PG3, PG4, and PG5 integrally rotate, thereby realizing the forward seventh speed D7, where a torque is output as inputted, and outputting a shifted torque to the output shaft OS connected with the second shaft TM2.

In this embodiment, in the forward eighth speed D8, the first and third clutches C1 and C3 and the second brake B2 are simultaneously operated.

As a result, the first shaft TM1 always receives an input torque by being fixedly connected with the input shaft IS, the second shaft TM2 is connected with the fifth shaft TM5 by the operation of the first clutch C1, and the third shaft TM3 is connected with the seventh shaft TM7 by the operation of the third clutch C3.

In addition, the eighth shaft TM8 acts as a fixed element by the operation of the second brake B2, thereby realizing the forward eighth speed D8 and outputting a shifted torque to the output shaft OS connected with the second shaft TM2.

In this embodiment, in the forward ninth speed D9, the first clutch C1 and the first and second brakes B1 and B2 are simultaneously operated.

As a result, the first shaft TM1 always receives an input torque by being fixedly connected with the input shaft IS, and the second shaft TM2 is connected with the fifth shaft TM5 by the operation of the first clutch C1.

In addition, the seventh and eighth shafts TM7 and TM8 act as fixed elements by the operation of the first and second brakes B1 and B2, thereby realizing the forward ninth speed D9 and outputting a shifted torque to the output shaft OS connected with the second shaft TM2.

In this embodiment, in the forward tenth speed D10, the first and second clutch C1 and C2 and the second brake B2 are simultaneously operated.

As a result, the first shaft TM1 always receives an input torque by being fixedly connected with the input shaft IS, the second shaft TM2 is connected with the fifth shaft TM5 by the operation of the first clutch C1, and the third shaft TM3 is connected with the fourth shaft TM4 by the operation of the second clutch C2.

In addition, the eighth shaft TM8 acts as a fixed element by the operation of the second brake B2, thereby realizing the forward tenth speed D10 and outputting a shifted torque to the output shaft OS connected with the second shaft TM2.

In this embodiment, in the reverse speed REV, the third clutch C3 and the first and third brakes B1 and B3 are simultaneously operated.

As a result, the first shaft TM1 always receives an input torque by being fixedly connected with the input shaft IS, and the third shaft TM3 is connected with the seventh shaft TM7 by the operation of the third clutch C3.

In addition, the seventh and ninth shafts TM7 and TM9 act as fixed elements by the operation of the first and third brakes B1 and B3, thereby realizing the reverse speed REV and outputting a shifted torque to the output shaft OS connected with the second shaft TM2.

Figure 3:
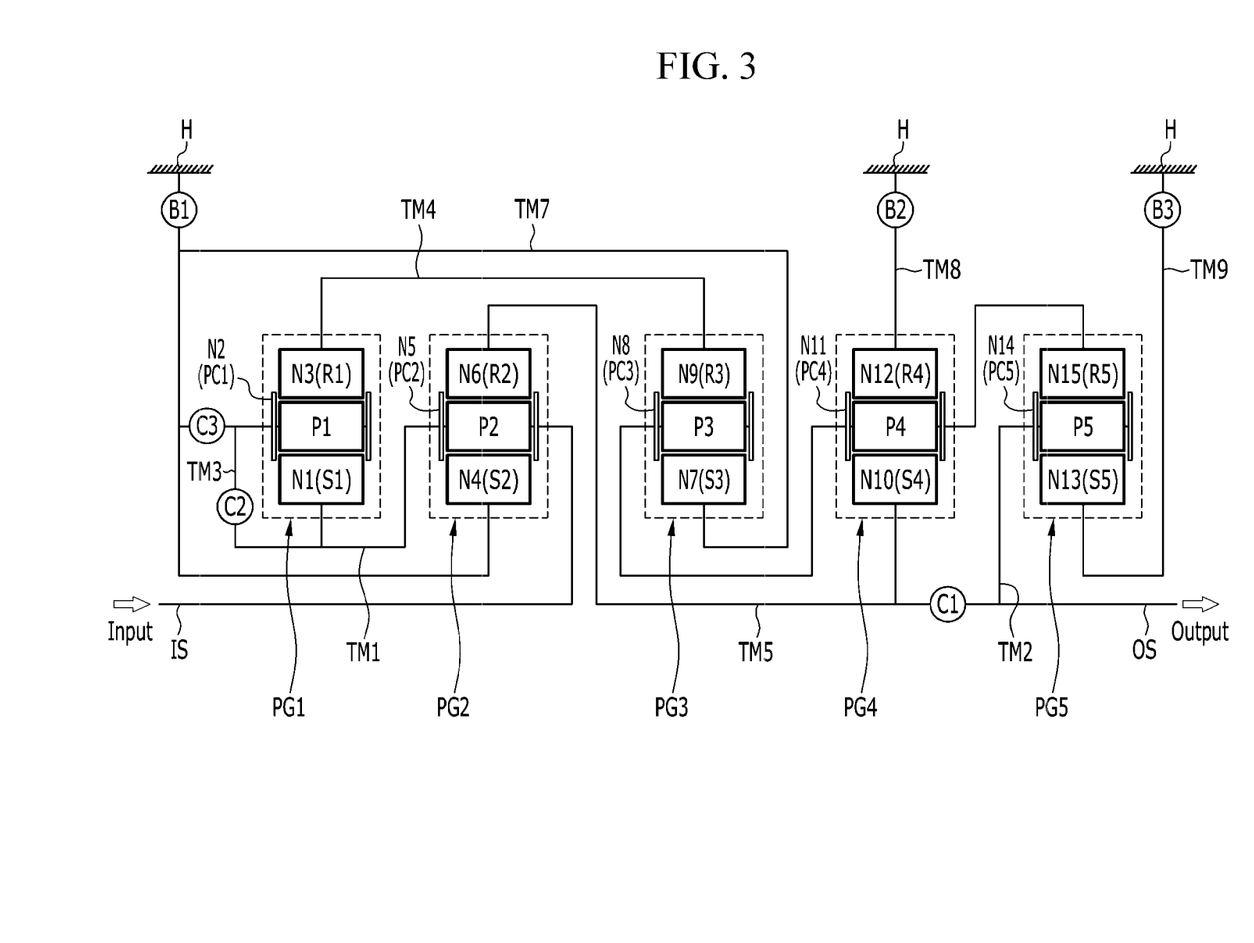
FIG. 3 is a schematic diagram of a planetary gear train according to a second embodiment of the present disclosure.

FIG. 3 is a schematic diagram of a planetary gear train according to a second embodiment of the present disclosure.

According to a planetary gear train according to a first embodiment of the present disclosure shown in FIG. 1, the second clutch C2 for integrally rotating the first planetary gear set PG1 is arranged to selectively connect the third shaft TM3 and the fourth shaft TM4. However, according to a planetary gear train according to a second embodiment of the present disclosure shown in FIG. 3, the second clutch C2 is arranged to selectively connect the first shaft TM1 and the third shaft TM3.

The planetary gear train according to a second embodiment differs from a planetary gear train according to a first embodiment in the location of the second clutch C2. However, operations and functions of the planetary gear train remain the same.

Figure 4:
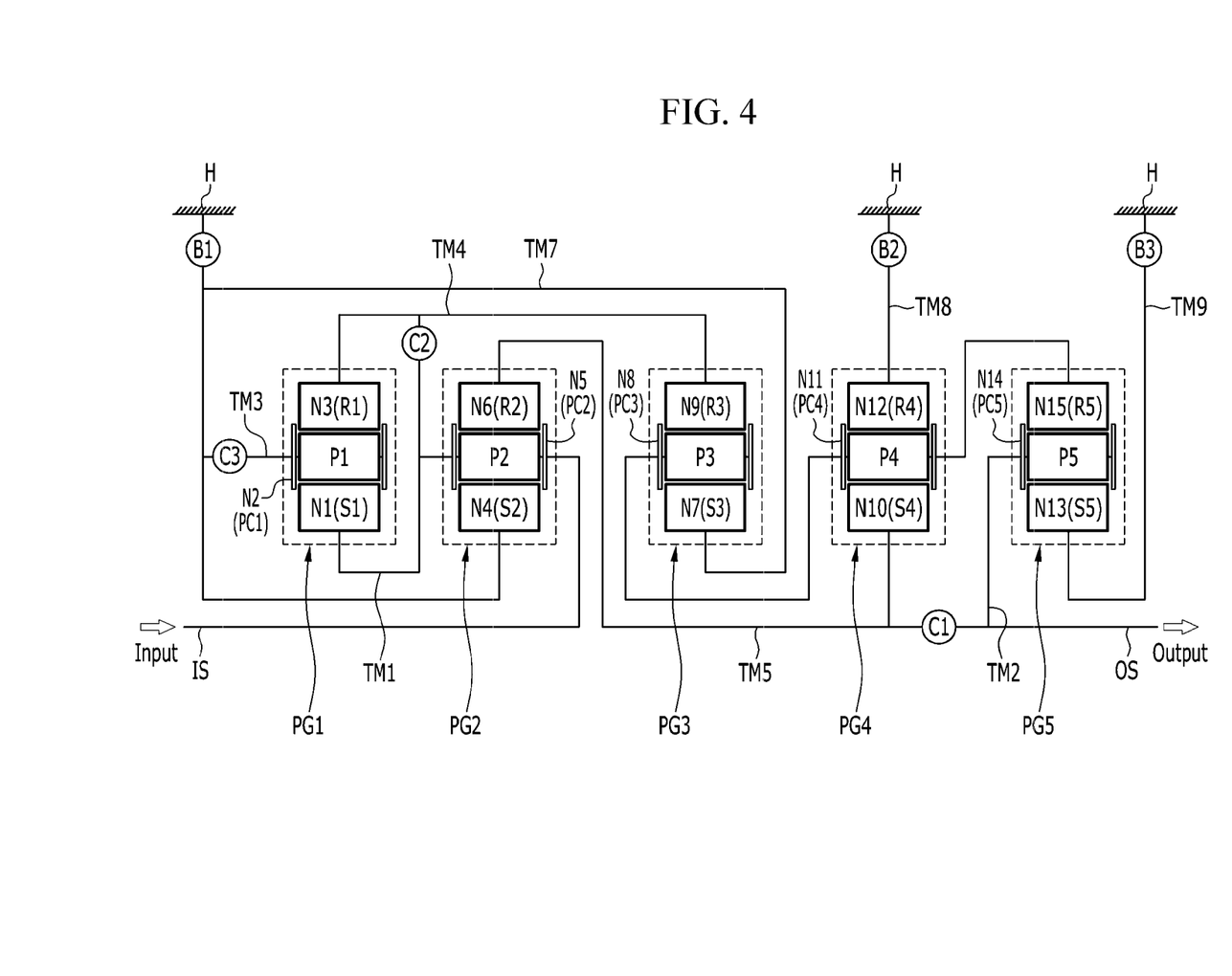
FIG. 4 is a schematic diagram of a planetary gear train according to a third embodiment of the present disclosure.

FIG. 4 is a schematic diagram of a planetary gear train according to a third embodiment of the present disclosure.

According to a planetary gear train according to a first embodiment of the present disclosure shown in FIG. 1, the second clutch C2 for integrally rotating the first planetary gear set PG1 is arranged to selectively connect the third shaft TM3 and the fourth shaft TM4. However, according to a planetary gear train according to a third embodiment of the present disclosure shown in FIG. 4, the second clutch C2 is arranged to selectively connect the first shaft TM1 and the fourth shaft TM4.

The planetary gear train according to a third embodiment differs from a planetary gear train according to a first embodiment in the location of the second clutch C2. However, operations and functions of the planetary gear train remain the same.

As described above, a planetary gear train according to an embodiment of the present disclosure may realize ten forward speeds and one reverse speed by operating five planetary gear sets PG1, PG2, PG3, PG4, and PG5 and may do so by controlling three clutches C1, C2, and C3 and three brakes B1, B2, and B3.

A planetary gear train according to an embodiment of the present disclosure realizes shifting by controlling five planetary gear sets PG1, PG2, PG3, PG4, and PG5 by six engagement elements C1, C2, C3, B1, B2, and B3. The disclosed planetary gear train may achieve uniform torque load over clutches and brakes and may minimize torque load applied to the respective shaft's connection with the rotation elements, thereby enhancing durability and efficiency.

In addition, a minimal number of engagement elements are controlled to realize shifting between shift-stages of ten forward speeds and one reverse speed. Accordingly, reduction of clutch drag, enhancement of torque transmission efficiency, and enhancement of flexibility of output gear ratios are achieved, thereby enhancing linearity of step ratios.

In addition, a gear ratio span may be increased to above 8.5 while realizing ten forward speeds and one reverse speed, thereby maximizing power performance and fuel economy.

In addition, a large number of shift-stages are realized. Accordingly, an engine speed may be maintained at a low speed by enabling an optimal shift-stage, thereby improving noise, vibration, and harshness (N.V.H.) characteristics of a vehicle.

While this invention has been described in connection with what is presently considered to be practical embodiments, it is to be understood that the disclosure is not limited to the disclosed embodiments. On the contrary, the disclosure is intended to cover various modifications and equivalent arrangements included within the spirit and scope of the appended claims.

What is claimed is:

1. A planetary gear train of an automatic transmission for a vehicle, the planetary gear train comprising:
    an input shaft for receiving an input torque;
    an output shaft for outputting a shifted torque;
    a first planetary gear set having a first, a second, and a third rotation element;
    a second planetary gear set having a fourth, a fifth, and a sixth rotation element;
    a third planetary gear set having a seventh, an eighth, and a ninth rotation element;
    a fourth planetary gear set having a tenth, an eleventh, and a twelfth rotation element;
    a fifth planetary gear set having a thirteenth, a fourteenth, and a fifteenth rotation element;
    a first shaft fixedly connected with the first rotation element, the fifth rotation element, and the input shaft;
    a second shaft fixedly connected with the fourteenth rotation element and the output shaft;
    a third shaft fixedly connected with the second rotation element;
    a fourth shaft fixedly connected with the third rotation element and the ninth rotation element;
    a fifth shaft fixedly connected with the sixth rotation element and the tenth rotation element;
    a sixth shaft fixedly connected with the eighth rotation element, the eleventh rotation element, and the fifteenth rotation element; and
    a plurality of additional shafts, wherein each of the plurality of additional shafts is selectively connected to a transmission housing and fixedly connected to a rotation element of the second, third, fourth, and fifth planetary gear sets that is not fixedly connected with any of the first to sixth shafts.

2. The planetary gear train of claim 1, wherein the plurality of additional shafts comprises:
    a seventh shaft fixedly connected with the fourth rotation element and the seventh rotation element and selectively connected with the transmission housing;
    an eighth shaft fixedly connected with the twelfth rotation element and selectively connected with the transmission housing; and
    a ninth shaft fixedly connected with the thirteenth rotation element and selectively connected with the transmission housing,
    wherein the second shaft and the fifth shaft, the third shaft and the fourth shaft, and the third shaft and the seventh shaft are selectively connected with each other, respectively.

3. The planetary gear train of claim 2, further comprising:
    three clutches each selectively connecting a corresponding pair among the input shaft, the output shaft, and the first to ninth shafts; and
    three brakes each selectively connecting the seventh shaft, the eighth shaft, and the ninth shaft to the transmission housing, respectively.

4. The planetary gear train of claim 3, wherein
    the three clutches comprise:
    a first clutch arranged between the second shaft and the fifth shaft;
    a second clutch arranged between the third shaft and the fourth shaft; and
    a third clutch arranged between the third shaft and the seventh shaft, and wherein the three brakes comprise:
    a first brake arranged between the seventh shaft and the transmission housing;
    a second brake arranged between the eighth shaft and the transmission housing; and
    a third brake arranged between the ninth shaft and the transmission housing.

5. The planetary gear train of claim 1, wherein the plurality of additional shafts comprises:
    a seventh shaft fixedly connected with the fourth rotation element and the seventh rotation element and selectively connected with the transmission housing;
    an eighth shaft fixedly connected with the twelfth rotation element and selectively connected with the transmission housing; and
    a ninth shaft fixedly connected with the thirteenth rotation element and selectively connected with the transmission housing,
    wherein the second shaft and the fifth shaft, the first shaft and the third shaft, and the third shaft and the seventh shaft are selectively connected with each other, respectively.

6. The planetary gear train of claim 5, further comprising:
    three clutches each selectively connecting a corresponding pair among the input shaft, the output shaft, and the first to ninth shafts; and
    three brakes each selectively connecting the seventh shaft, the eighth shaft, and the ninth shaft to the transmission housing, respectively.

7. The planetary gear train of claim 6, wherein
    the three clutches comprise:
    a first clutch arranged between the second shaft and the fifth shaft;

a second clutch arranged between the first shaft and the third shaft; and a third clutch arranged between the third shaft and the seventh shaft, and wherein the three brakes comprise:

a first brake arranged between the seventh shaft and the transmission housing;

a second brake arranged between the eighth shaft and the transmission housing; and a third brake arranged between the ninth shaft and the transmission housing.

8. The planetary gear train of claim 1, wherein the plurality of additional shafts comprises:

a seventh shaft fixedly connected with the fourth rotation element and the seventh rotation element and selectively connected with the transmission housing;

an eighth shaft fixedly connected with the twelfth rotation element and selectively connected with the transmission housing; and a ninth shaft fixedly connected with the thirteenth rotation element and selectively connected with the transmission housing, wherein the second shaft and the fifth shaft, the first shaft and the fourth shaft, and the third shaft and the seventh shaft are selectively connected with each other, respectively.

9. The planetary gear train of claim 8, further comprising:

three clutches each selectively connecting a corresponding pair among the input shaft, the output shaft, and the first to ninth shafts; and three brakes each selectively connecting the seventh shaft, the eighth shaft, and the ninth shaft to the transmission housing, respectively.

10. The planetary gear train of claim 9, wherein the three clutches comprise:

a first clutch arranged between the second shaft and the fifth shaft;

a second clutch arranged between the first shaft and the fourth shaft; and a third clutch arranged between the third shaft and the seventh shaft, and wherein the three brakes comprise:

a first brake arranged between the seventh shaft and the transmission housing;

a second brake arranged between the eighth shaft and the transmission housing; and a third brake arranged between the ninth shaft and the transmission housing.

11. The planetary gear train of claim 1, wherein:

the first planetary gear set is a single pinion planetary gear set having a first sun gear, a first planet carrier, and a first ring gear as the first, second, and third rotation elements, respectively;

the second planetary gear set is a single pinion planetary gear set having a second sun gear, a second planet carrier, and a second ring gear as the fourth, fifth, and sixth rotation elements, respectively;

the third planetary gear set is a single pinion planetary gear set having a third sun gear, a third planet carrier, and a third ring gear as the seventh, eighth, and ninth rotation elements, respectively;

the fourth planetary gear set is a single pinion planetary gear set having a fourth sun gear, a fourth planet carrier, and a fourth ring gear as the tenth, eleventh, and twelfth rotation elements, respectively; and the fifth planetary gear set is a single pinion planetary gear set having a fifth sun gear, a fifth planet carrier, and a fifth ring gear as the thirteenth, fourteenth, and fifteenth rotation elements, respectively.

12. A planetary gear train of an automatic transmission for a vehicle, the planetary gear train comprising:

an input shaft for receiving an input torque;

an output shaft for outputting a shifted torque;

a first planetary gear set having a first, a second, and a third rotation element;

a second planetary gear set having a fourth, a fifth, and a sixth rotation element;

a third planetary gear set having a seventh, an eighth, and a ninth rotation element;

a fourth planetary gear set having a tenth, an eleventh, and a twelfth rotation element; and a fifth planetary gear set having a thirteenth, a fourteenth, and a fifteenth rotation element, wherein the first rotation element is fixedly connected with the fifth rotation element and the input shaft, the third rotation element is fixedly connected with the ninth rotation element and selectively connected with the second rotation element, the fourth rotation element is fixedly connected with the seventh rotation element and selectively connected with the second rotation element and a transmission housing respectively, the sixth rotation element is fixedly connected with the tenth rotation element, the eighth rotation element is fixedly connected with the eleventh rotation element and the fifteenth rotation element, the twelfth rotation element is selectively connected with the transmission housing, the thirteenth rotation element is selectively connected with the transmission housing, and the fourteenth rotation element is fixedly connected with the output shaft and selectively connected with the tenth rotation element.

13. The planetary gear train of claim 12, further comprising:

three clutches each selectively connecting a corresponding pair of the rotation elements; and three brakes each selectively connecting the fourth rotation element, the twelfth rotation element, and the thirteenth rotation element to the transmission housing, respectively.

14. The planetary gear train of claim 13, wherein the three clutches comprise:

a first clutch arranged between the tenth rotation element and the fourteenth rotation element;

a second clutch arranged between the second rotation element and the third rotation element; and a third clutch arranged between the second rotation element and the fourth rotation element, and wherein the three brakes comprise:

a first brake arranged between the fourth rotation element and the transmission housing;

a second brake arranged between the twelfth rotation element and the transmission housing; and a third brake arranged between the thirteenth rotation element and the transmission housing.

15. The planetary gear train of claim 12, wherein:

the first planetary gear set is a single pinion planetary gear set having a first sun gear, a first planet carrier, and a first ring gear as the first, second, and third rotation elements, respectively;

the second planetary gear set is a single pinion planetary gear set having a second sun gear, a second planet carrier, and a second ring gear as the fourth, fifth, and sixth rotation elements, respectively;

the third planetary gear set is a single pinion planetary gear set having a third sun gear, a third planet carrier, and a third ring gear as the seventh, eighth, and ninth rotation elements, respectively;

the fourth planetary gear set is a single pinion planetary gear set having a fourth sun gear, a fourth planet carrier, and a fourth ring gear as the tenth, eleventh, and twelfth rotation elements, respectively; and the fifth planetary gear set is a single pinion planetary gear set having a fifth sun gear, a fifth planet carrier, and a fifth ring gear as the thirteenth, fourteenth, and fifteenth rotation elements, respectively.

\* \* \* \* \*

UNITED STATES PATENT AND TRADEMARK OFFICE
CERTIFICATE OF CORRECTION

PATENT NO. : 10,731,734 B2
APPLICATION NO. : 15/962717
DATED : August 4, 2020
INVENTOR(S) : Jin Ho Kim et al.

It is certified that error appears in the above-identified patent and that said Letters Patent is hereby corrected as shown below:

In the Claims

Column 11, Line 39 (approx.) - Column 15, should read:

1. A planetary gear train of an automatic transmission for a vehicle, the planetary gear train comprising:
    an input shaft for receiving an input torque;
    an output shaft for outputting a shifted torque;
    a first planetary gear set having a first, a second, and a third rotation element;
    a second planetary gear set having a fourth, a fifth, and a sixth rotation element;
    a third planetary gear set having a seventh, an eighth, and a ninth rotation element;
    a fourth planetary gear set having a tenth, an eleventh, and a twelfth rotation element;
    a fifth planetary gear set having a thirteenth, a fourteenth, and a fifteenth rotation element;
    a first shaft fixedly connected with the first rotation element, the fifth rotation element, and the input shaft;
    a second shaft fixedly connected with the fourteenth rotation element and the output shaft;
    a third shaft fixedly connected with the second rotation element;
    a fourth shaft fixedly connected with the third rotation element and the ninth rotation element;
    a fifth shaft fixedly connected with the sixth rotation element and the tenth rotation element;
    a sixth shaft fixedly connected with the eighth rotation element, the eleventh rotation element, and the fifteenth rotation element; and
    a plurality of additional shafts, wherein each of the plurality of additional shafts is selectively connected to a transmission housing and fixedly connected to a rotation element of the second, third, fourth, and fifth planetary gear sets that is not fixedly connected with any of the first to sixth shafts,
    wherein the plurality of additional shafts includes
    a seventh shaft fixedly connected with the fourth rotation element and the seventh rotation element and selectively connected with the transmission housing,
    an eighth shaft fixedly connected with the twelfth rotation element and selectively connected with the transmission housing, and Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office* a ninth shaft fixedly connected with the thirteenth rotation element and selectively connected with the transmission housing.

2. The planetary gear train of claim 1, wherein the second shaft and the fifth shaft, the third shaft and the fourth shaft, and the third shaft and the seventh shaft are selectively connected with each other, respectively.

3. The planetary gear train of claim 2, further comprising:
  three clutches; and
  three brakes each selectively connecting the seventh shaft, the eighth shaft, and the ninth shaft to the transmission housing, respectively.

4. The planetary gear train of claim 3, wherein
  the three clutches comprise:
  a first clutch arranged between the second shaft and the fifth shaft;
  a second clutch arranged between the third shaft and the fourth shaft; and
  a third clutch arranged between the third shaft and the seventh shaft, and
  wherein the three brakes comprise:
  a first brake arranged between the seventh shaft and the transmission housing;
  a second brake arranged between the eighth shaft and the transmission housing; and
  a third brake arranged between the ninth shaft and the transmission housing.

5. The planetary gear train of claim 1, wherein the second shaft and the fifth shaft, the first shaft and the third shaft, and the third shaft and the seventh shaft are selectively connected with each other, respectively.

6. The planetary gear train of claim 5, further comprising:
  three clutches; and
  three brakes each selectively connecting the seventh shaft, the eighth shaft, and the ninth shaft to the transmission housing, respectively.

7. The planetary gear train of claim 6, wherein
  the three clutches comprise:
  a first clutch arranged between the second shaft and the fifth shaft;
  a second clutch arranged between the first shaft and the third shaft; and
  a third clutch arranged between the third shaft and the seventh shaft, and
  wherein the three brakes comprise:
  a first brake arranged between the seventh shaft and the transmission housing;
  a second brake arranged between the eighth shaft and the transmission housing; and
  a third brake arranged between the ninth shaft and the transmission housing.

8. The planetary gear train of claim 1, wherein the second shaft and the fifth shaft, the first shaft and the fourth shaft, and the third shaft and the seventh shaft are selectively connected with each other, respectively.

9. The planetary gear train of claim 8, further comprising:
   three clutches; and
   three brakes each selectively connecting the seventh shaft, the eighth shaft, and the ninth shaft to the transmission housing, respectively.

10. The planetary gear train of claim 9, wherein
   the three clutches comprise:
   a first clutch arranged between the second shaft and the fifth shaft;
   a second clutch arranged between the first shaft and the fourth shaft; and
   a third clutch arranged between the third shaft and the seventh shaft, and
   wherein the three brakes comprise:
   a first brake arranged between the seventh shaft and the transmission housing;
   a second brake arranged between the eighth shaft and the transmission housing; and
   a third brake arranged between the ninth shaft and the transmission housing.

11. The planetary gear train of claim 1, wherein:
   the first planetary gear set is a single pinion planetary gear set having a first sun gear, a first planet carrier, and a first ring gear as the first, second, and third rotation elements, respectively;
   the second planetary gear set is a single pinion planetary gear set having a second sun gear, a second planet carrier, and a second ring gear as the fourth, fifth, and sixth rotation elements, respectively;
   the third planetary gear set is a single pinion planetary gear set having a third sun gear, a third planet carrier, and a third ring gear as the seventh, eighth, and ninth rotation elements, respectively;
   the fourth planetary gear set is a single pinion planetary gear set having a fourth sun gear, a fourth planet carrier, and a fourth ring gear as the tenth, eleventh, and twelfth rotation elements, respectively; and
   the fifth planetary gear set is a single pinion planetary gear set having a fifth sun gear, a fifth planet carrier, and a fifth ring gear as the thirteenth, fourteenth, and fifteenth rotation elements, respectively.

12. A planetary gear train of an automatic transmission for a vehicle, the planetary gear train comprising:
   an input shaft for receiving an input torque;
   an output shaft for outputting a shifted torque;
   a first planetary gear set having a first, a second, and a third rotation element;
   a second planetary gear set having a fourth, a fifth, and a sixth rotation element;
   a third planetary gear set having a seventh, an eighth, and a ninth rotation element;
   a fourth planetary gear set having a tenth, an eleventh, and a twelfth rotation element; and
   a fifth planetary gear set having a thirteenth, a fourteenth, and a fifteenth rotation element, wherein
   the first rotation element is fixedly connected with the fifth rotation element and the input shaft,
   the third rotation element is fixedly connected with the ninth rotation element and selectively connected with the second rotation element,